US007484219B2

(12) United States Patent (10) Patent No.: US 7,484,219 B2
Mitra (45) Date of Patent: Jan. 27, 2009

(54) SYNCHRONIZING CENTRALIZED DATA STORE FROM DISTRIBUTED INDEPENDENT DATA STORES USING FIXED APPLICATION PROGRAMMING INTERFACES

(75) Inventor: Kanchan Mitra, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 632 days.

(21) Appl. No.: 10/301,223

(22) Filed: Nov. 21, 2002

(65) Prior Publication Data

US 2004/0103098 A1    May 27, 2004

(51) Int. Cl.
*G06F 13/00* (2006.01)
(52) U.S. Cl. .................. 719/316; 719/328; 707/100; 707/101
(58) Field of Classification Search ................ 719/316, 719/328; 707/103 R, 103 Y, 103 Z, 100, 707/101
See application file for complete search history.

(56) References Cited

U.S. PATENT DOCUMENTS

| | | | | |
|---|---|---|---|---|
| 6,119,118 | A * | 9/2000 | Kain et al. ..................... 707/10 |
| 6,178,425 | B1 | 1/2001 | Brodersen et al. |
| 6,189,011 | B1 | 2/2001 | Lim et al. |
| 6,295,541 | B1 | 9/2001 | Bodnar et al. |
| 6,321,374 | B1 * | 11/2001 | Choy ........................ 717/106 |
| 6,523,036 | B1 * | 2/2003 | Hickman et al. .............. 707/10 |
| 6,578,068 | B1 * | 6/2003 | Bowman-Amuah ......... 709/203 |
| 6,615,204 | B1 * | 9/2003 | Menon ........................... 707/3 |
| 6,694,506 | B1 * | 2/2004 | LeBlanc et al. ............. 717/108 |
| 6,745,381 | B1 * | 6/2004 | Ehnebuske et al. .......... 717/100 |
| 7,013,307 | B2 * | 3/2006 | Bays et al. .................. 707/102 |
| 7,085,803 | B1 * | 8/2006 | Shisler et al. ............... 709/201 |
| 7,349,895 | B2 * | 3/2008 | Liu et al. ........................ 707/3 |
| 2002/0046301 | A1 * | 4/2002 | Shannon et al. ............. 709/328 |
| 2004/0061719 | A1 * | 4/2004 | Barsness et al. ............. 345/760 |

OTHER PUBLICATIONS

"Siebel System Awarded Additional US Patents for Data Synchronization Technology: Siebel Synchronization Manages Thousands of Mobile Users at Large Global Companies," Business Wire, Apr. 18, 2001.
"A Novel Conflict Detection and Resolution Strategy Based on TLRSP in Replicated Mobile Database Systems," Ding et al., 2001, pp. 234-240.
"Synchronizing a Database to Improve Freshness," Cho et al., ACM, Institute of Electrical Engineers, Jun. 2000, pp. 117-128.
"Server Gets Portables Under Control," Jason Brooks, PC Week, Mar. 27, 2000, pp. 37-38.
"T3C: A Temporally Correct Concurrency Control Algorithm for Distributed Databases," Boukerche, et al., IEEE, 2000, pp. 155-163.

* cited by examiner

*Primary Examiner*—Andy Ho
(74) *Attorney, Agent, or Firm*—Birch, Stewart, Kolasch & Birch, LLP

(57) ABSTRACT

A data transfer protocol utilizes a set of actions for affecting different objects that are stored in a data store. The data transfer protocol supports a set of application programming interfaces (APIs) that are applicable to the different objects. With the APIs, the data transfer protocol may synchronize a centralized data store with independent data stores. The data transfer protocol may support data that is hierarchical while maintaining referential integrity. Node objects may vary from nightly bulk uploads to interactive users uploading or querying smaller portions of the database. The data transfer protocol provides the semantics to carry out these operations with a fixed number of APIs for any arbitrary database. The data uploads may be sparse depending on what the remote data store holds and need not be in serial order.

30 Claims, 5 Drawing Sheets

SYNCHRONIZING CENTRALIZED DATA STORE FROM DISTRIBUTED INDEPENDENT DATA STORES USING FIXED APPLICATION PROGRAMMING INTERFACES

FIELD OF THE INVENTION

The invention generally relates to synchronizing a centralized data store with a fixed set of application programming interfaces.

BACKGROUND OF THE INVENTION

Today as applications are moving towards a distributed model on the web, it is becoming more important for applications to communicate with other applications. Synchronizing of data of a centralized data store is no longer limited to a client and the server but has been extended to peer to peer. The centralized data often requires synchronization of distributed independent data stores that update the centralized data store. For example, uploading of data into the centralized data store may necessitate a complete uploading of a document or only a partial uploading of the document (i.e. increment updates if only modifications to the document are required). As applications attempt to communicate with other applications, applications may utilize a common approach in relation to the data and the semantics in synchronizing exchanged data.

As an example, the financial market is no longer untapped. There are financial firms that have developed their own solutions, in which news content and quotes are often blended into financial data such as client's portfolios. Centralized data stores that are associated with each type of data are typically uploaded by the financial firm and retrieved by a client. However, the different solutions are incompatible in many cases. Each financial firm may have an information technology (IT) department that develops and maintains the firm's proprietary solution. This scenario is disadvantageous to the financial firm in that finance is the main focus of the financial firm and not developing IT solutions. Moreover, other services, other than financial services, may experience common needs.

With the prior art, a data transfer protocol typically requires an application programming interface (API) to be defined for each data object. Moreover, batching operations may generate additional issues. Thus, it would be an advancement in the art to provide method and apparatus in which a common platform may be used by different users in developing services in which data may be synchronized. Furthermore, the platform should enable a user to expand the user's service (such as adding a new data object type) with a minimal amount of effort.

BRIEF SUMMARY OF THE INVENTION

The inventive method and apparatus overcome the problems of the prior art by providing a data transfer protocol that utilizes a set of actions for affecting different types of objects that are stored in a data store. From the set of actions, the data transfer protocol supports a set of application programming interfaces (APIs) that are applicable to the different objects. With the APIs, the data transfer protocol may synchronize a centralized data store with independent data stores. The data transfer protocol may support data that is hierarchical while maintaining referential integrity, in which objects may refer to other objects. Node objects, in which data is uploaded, may vary from nightly bulk uploads to interactive users uploading or querying smaller portions of the database. The data transfer protocol provides the semantics to carry out these operations with a fixed number of APIs for any arbitrary database. The data uploads can be sparse depending on what the remote data store holds. The data uploads need not be in serial order.

In an embodiment of the invention, the data transfer protocol supports a set of actions consisting of a None action, an Update action, an UpdateAttributes action, a Delete action, a Replace action, a ReplaceAttributes action, a Query action, and a QueryAttributes action. The set of APIs consists of a SubmitBatch, a SubmitBatchSync, a FindRecentBatchIDs, and QueryBatchResults. (Other embodiments of the invention may utilize a different set of APIs, in which the set has a different number of APIs.) The APIs support the batching of operations, where each corresponding payload may contain multiple objects in a single transaction. The set of APIs support both synchronous and asynchronous operations.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In order to clarify the disclosure of the invention, definitions of several relevant terms are provided herein.

Node: an object that is a basic type of the Document Object Model. A nodeobject represents a single node object in the document tree.

Element: a type of node object. An element may have attributes that are considered to be properties of the element rather than children of the element.

Attribute: property associated with an element and depicted as a name-value pair.

Schema: a formal way of defining and validating the content of a document. As an example, a document may be specified by XML (eXtensible Markup Language). If a well-formed document conforms to its associated schema, the document is referred as being valid.

Figure 1:
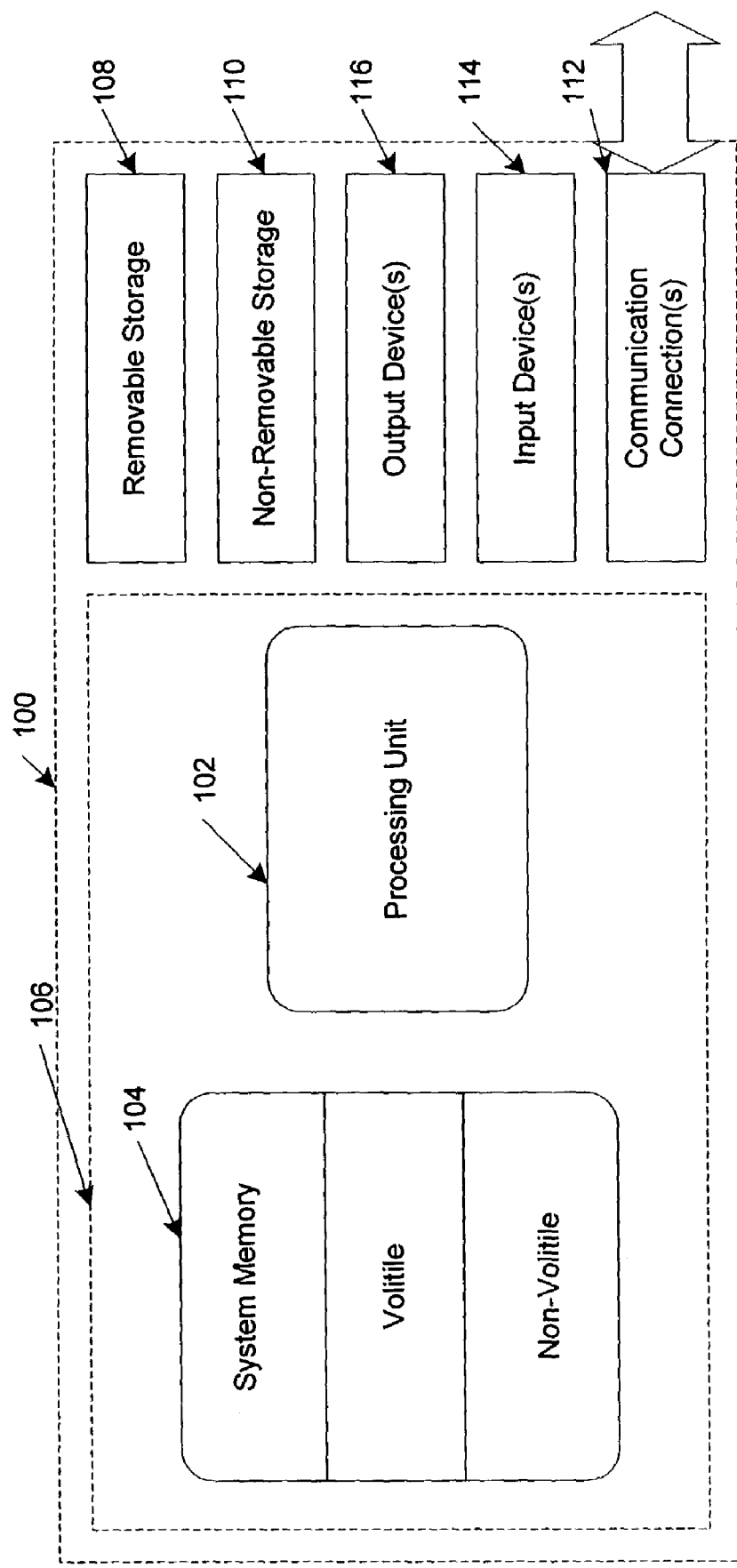
FIG. 1 illustrates an example of a suitable computing system environment on which the invention may be implemented.

With reference to FIG. 1, an exemplary system for implementing the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communication connection(s) 112 that allow the device to communicate with other devices. Communication connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length herein.

Figure 2:
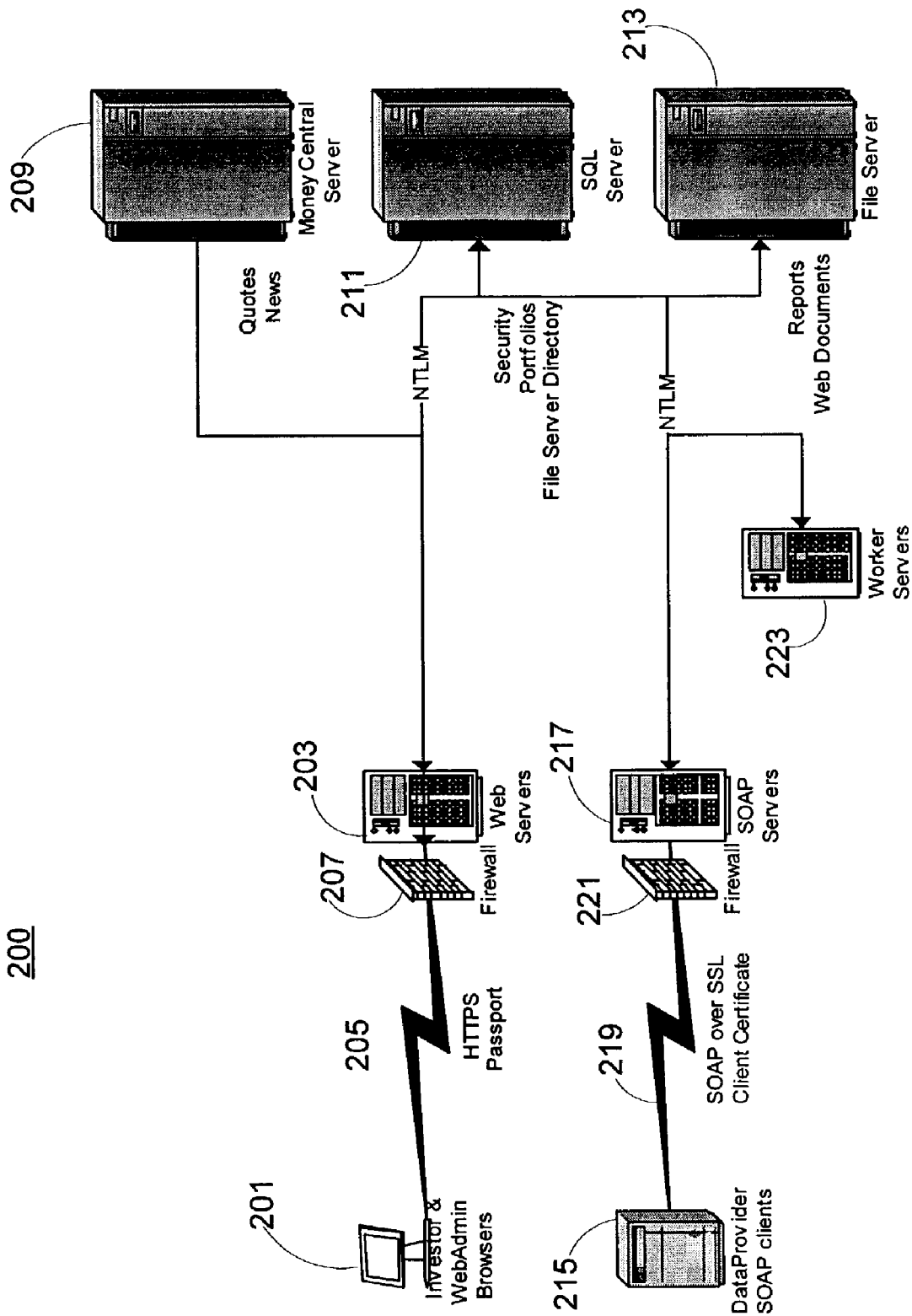
FIG. 2 shows a schematic layout of a server network in accordance with an embodiment of the invention.

FIG. 1 illustrates an example of a suitable computing system environment 100 on which the invention may be implemented. (For example, servers 203, 217, and 223, as shown in FIG. 2 may utilize computing system environment 100.) The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 2 shows a schematic layout of a server network 200 that provides financial information to investors in accordance with an embodiment of the invention. Server network 200 comprises a news-quotes server 209, a SQL server 211, and a file server 213. In variations of the embodiment, server network 200 may support a plurality of news-quotes servers, SQL servers, or file servers. An investor, financial advisor, or web administrator accesses information from servers 209, 211, and 213 by accessing web server 203 from a browser 201 through a secure HTTP (HTTPS) connection (as may be provided by a Microsoft Passport service) and through a firewall 207.

The investor may access financial information about quotes and financial news that are not specific to the investor from news-quotes server 209. Server 209 may obtain information from different news sources (that are not shown). Also, the inventor may obtain information that is specific to the investor (e.g. portfolio reports and security trades) from SQL server 211. Because the investor-specific information is private information, investor specific information is typically encrypted when stored on SQL server 211. Additionally, the investor may obtain reports and documents from file server 213. Because of the sensitivity and proprietary nature of this proprietary information, it is also typically encrypted when stored on file server 213. Web server 203 communicates with servers 211 over a connection that supports Microsoft NTLM.

A data provider provides investment data (often referred as a payload) for investors from computer 215 to a SOAP server 217 over a connection 219 that supports Simple Object Access Protocol (SOAP) through firewall 221. (With some embodiments, a plurality of SOAP servers may be supported.) The data provider typically sends investment information in data batches during off-peak hours in order to update information (e.g. by sending incremental information about changes in the investor's portfolio) or to provide complete set of information (e.g. information about a new investor). Information comprises mostly of portfolios and reports and may be uploaded in portions or in full. Investors may retrieve the information securely from the website. Information may also be enriched by augmenting the information with live quotes and news from new-quotes server 209.

Figure 3:
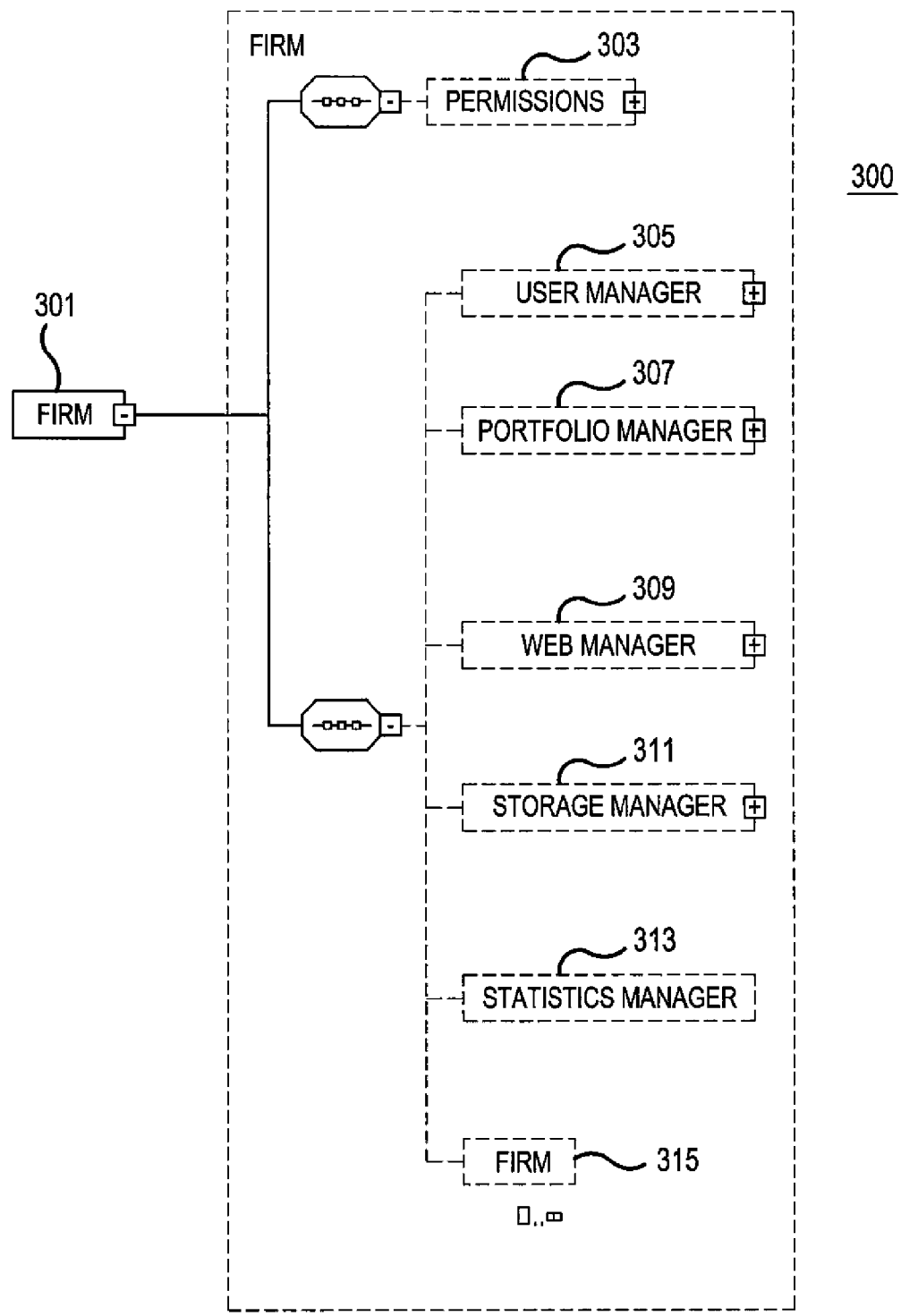
FIG. 3 shows a schema for a firm node object in accordance with an embodiment of the invention.

FIG. 3 shows a schema 300 for a firm node object (element) 301 in accordance with an embodiment of the invention. (A schema defines XML submissions that will be accepted by server network 200.) Data objects, such as firm node object 301 and a user node object 401 (that is discussed in the context of FIG. 4), may be stored on a server such as SQL server 211 or file server 213 as shown in FIG. 2.

A service, as may be supported by the platform shown in FIG. 2, defines a schema of a firm node object 301 that a data provider 215 uploads to the service. In the exemplary embodiment, the schema precisely defines the data structure that is used by a financial service to format and keep track of data for the advisory firm. The schema forms a definition in which data provider 215 collects data from advisory firms and sends the data through SOAP interface 219, SOAP server 217, and worker server 223 for storage on either SQL server 211 or file server 213, depending upon the nature of the corresponding data. In the exemplary embodiment, data are structured in accordance with eXtensible Markup Language (XML).

Referring to FIG. 3, there are several types of managers, including a userManger 305, a portfolioManager 307, a webManager 309, a storageManager 311, and a statisticsManager 313. Data is grouped under the managers because the managers contain configuration settings that define policies for the data.

A permissions list is an access control list that indicates which users have permission to view or edit a node object being secured. UserManager 305 provides data about investors and advisor and about related settings. PortfolioManager 307 contains information about portfolios, investments, and settings that affect the calculation and display of portfolios. WebManager 309 determines access to administration tools of server network 200. StorageManager 311 contains a collection of published documents.

Canonical representation helps in defining a behavior of the service. In the embodiment, the service represents the behavior of the service through annotations on the data. For example, permission block 303 on firm node object 301 serves as the access control list that indicates which users have access to view or edit node object 301. When references to users are added to permissions 303 on firm node object 301, the service grants administrative privileges to those users. The annotations on the data define the behavior of the service.

A hierarchical organization provides natural scoping for any of the behaviors. In the example of the permissions, the administrative privileges are granted to everything within the firm because of the nesting. This is analogous to the Windows NT® file system where the access to the root folder can automatically be inherited by the sub folders and files. A container model is optimal for representing hierarchic relationships. The container model also provides a unique name for each of the objects in the system.

All elements, e.g. firm 301, user 401 (shown in FIG. 4), a document (not shown), or a portfolio (not shown), are marked optional in order to aid in representing partial data. The support of partial data is useful for providing referential integrity, which is discussed later. Partial data is applicable in transferring sparse data that is typical for incremental updates. Not only can elements, but also attributes, be incomplete. However, not everything is marked as being optional. An identification ("id") to an object is provided in order to uniquely identify the object that is being operated on. The partial data representation enables an exchange with a reduced amount of data for the service, thus enhancing data transfer efficiency. The same representation lends itself to bulk uploads as well.

Figure 4:
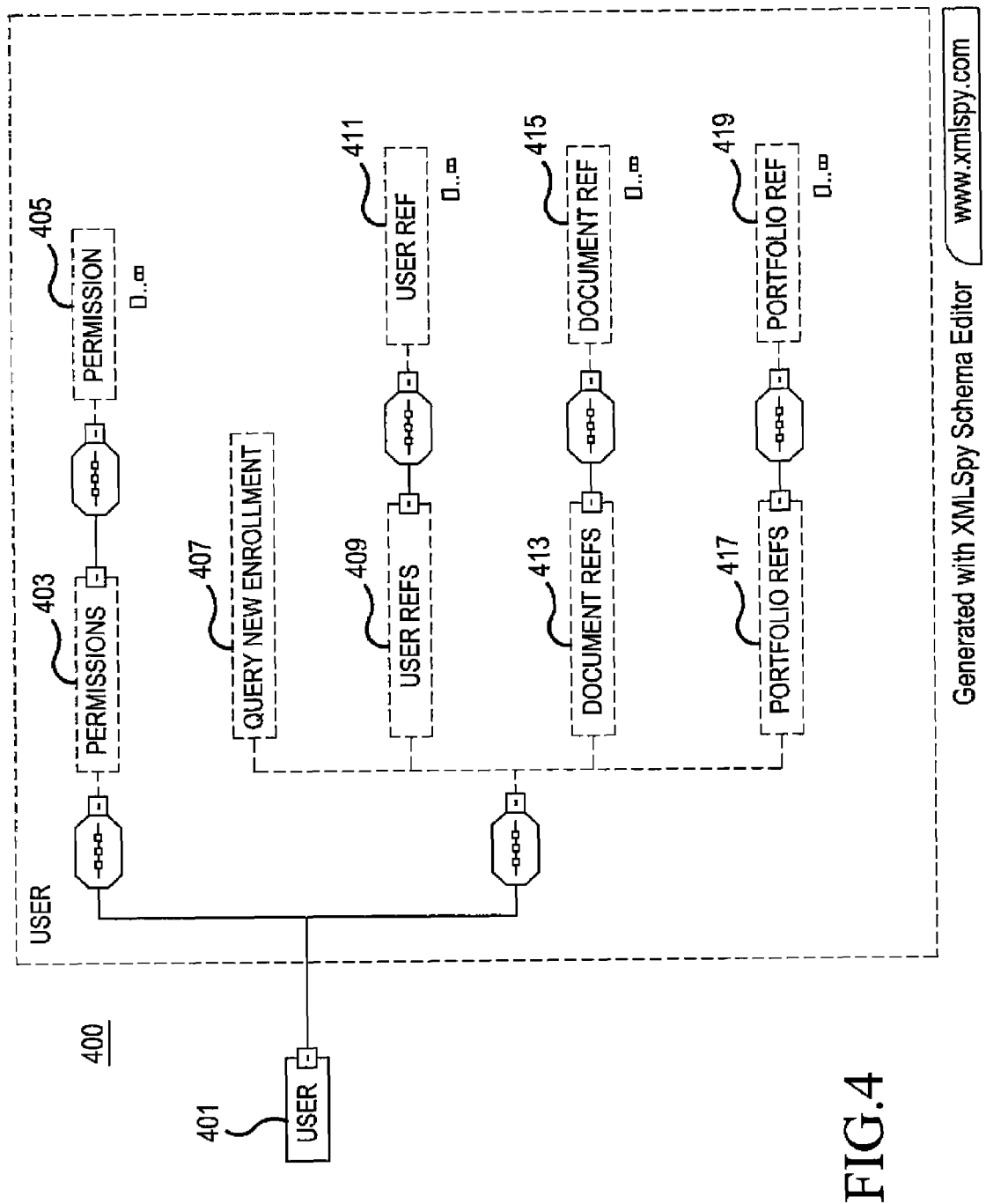
FIG. 4 shows a schema for a user node object in accordance with an embodiment of the invention.

FIG. 4 shows a schema 400 for a user node object 401 in accordance with an embodiment of the invention.

References to objects are depicted in the schema through Ref objects. Ref objects reference other objects in the system by their "id". With partial data representation, referential integrity may be complex. Referential integrity relates to a capability in which an object may point to other objects. For example a user object may refer to different documents (which are objects), corresponding to documents that a user may access. Moreover, referential integrity denotes that if a referenced object is removed, references to the object are deleted. The data transfer protocol (which correspond to a set of actions and a set of application programming interfaces and will be later discussed) enables the service to remove all references whenever an object (e.g. object 301) is deleted. It also enables the service to prepare a new object in case a reference was made to the object. Since objects can support partial data, the support of partial data allows for objects to be created with just the "id". User object 401, as shown in the FIG. 4, in which user object 401 has references to other user objects, document objects and portfolio objects. References are not objects in themselves. Referring to FIG. 2, document objects are typically stored in server 213 while portfolio objects are typically stored in server 211.

Referring to FIG. 4, queryNewEnrollment 407 is a temporary identification used during an enrollment process. A documentRefs collection 413 is an information cache that enhances the user interface when determining which documents that the the user can access. A documentRef 415 is a reference to a specific published document (i.e. a document object). A portfolioRefs collection 417 is an information cache that enhances the user interface when determining which portfolios the user can access. A portfolioRef 419 is a reference to a specific portfolio (i.e. portfolo object). A userRefs collection 409 is an information cache that enhances a user interface when determining which investors or advisors that the user can access. A userRef 411 is a reference to a specific investor or advisor that can be accessed The embodiment of the invention may support additional objects in order to expand a service. For example, server network 200 may support additional types of objects to support finanacial quotes or news articles in order to expand the service offered by server network 200.

The schema (as represented by schema 300 and schema 400) can readily be expanded to include other types of data to keep up with the growing business needs. Although server network 200 has provided this schema definition for the service, the data transfer protocol is agnostic about the structure of the underlying data. This separation of data transfer protocol from the underlying data structure helps in expanding the schema in the future without having to define a new data transfer protocol. It also means that the data transfer protocol can be applied to other services as well without the need for additional APIs.

Figure 5:
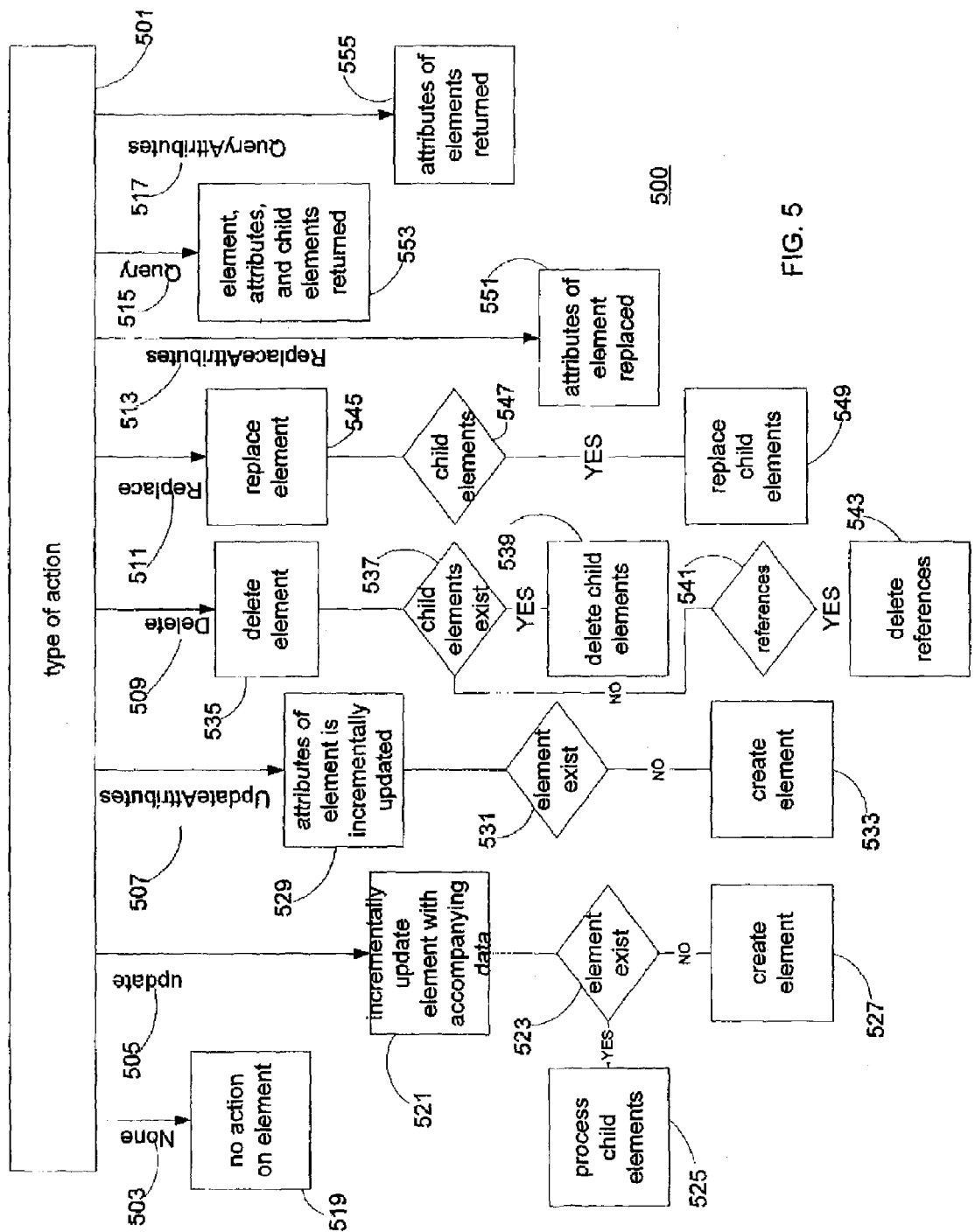
FIG. 5 shows actions and associated semantics that are applicable to different objects in accordance with an embodiment of the invention.

FIG. 5 illustrates actions 503-517 and associated semantics that are applicable to different objects in accordance with an embodiment of the invention. In semantic box 501, server network 200 determines a type of action being requested on an object. The types of actions include a None action 503, an Update action 505, an UpdateAttributes action 507, a Delete action 509, a Replace action 511, a ReplaceAttributes action 513, a Query action 515, and a QueryAttributes action 517.

FIG. 5 shows the semantics for actions None 503, Update 505, UpdateAttributes 507, Delete 509, Replace 511, ReplaceAttributes 513, Query 515, and QueryAttributes 517. Actions 503-517 may be applicable to substantially all objects, irrespective of service. With None action 503, no action is performed on the object (element) as shown in semantic box 519. Child elements of the element are processed individually. None action 503 is typically used for navigating to the objects that are to be operated on. With Update action 505, the specified object is incrementally updated with the accompanying data as shown in semantic box 521. For example, XML script may cause the updating of some but not all of the element's attributes. The other attributes are unchanged. Having the capability of incrementally updating the object rather than only updating the entire object, assists in providing inferential integrity. If the specified object (element) does not exist as shown in semantics box 523, the object is created as shown in semantics box 527. Also, with Update action 505, child elements are processed as shown in semantics box 525. Any of the actions that operate on child objects (e.g. Replace 511 and Update 505) can contain subnodes with that action only. Thus, it is illegal for a node with the Update action to contain nodes that have a Replace action. A Delete node cannot contain subnodes.

Delete action 509 deletes the specified element as shown in semantics box 535, any child elements (as shown in semantics boxes 537 and 539, and any references as shown in semantics boxes 541 and 543. Replace action 511 replaces the specified element as shown in semantics box 545, and child elements as shown in semantic boxes 547 and 549. However, references to the replaced object are not affected.

The embodiment also specifies actions that are related to the attributes of an object. UpdateAttributes action 507 incrementally updates the attributes of the specified element as shown in semantics box 529. If the element does not exist as shown in semantics box 531, the element is updated as shown in semantics box 533. ReplaceAttributes action 513, as shown in semantics box 551, replaces the attributes of the element, which is effectively a delete followed by an update of the attributes.

Query action 515 returns the element, its attributes and child elements as shown in semantics box 553. QueryAttributes 517 returns attributes of the specified elements as shown I semantics box 555. Query action 515 and QueryAttributes 517 support the query of data and associated attributes. With Query action 515, all the data and the child elements may be retrieved. Actions 515 and 517 provide fidelity of a data store in that a user can determine the state of the data store. To add support for scoped searches, an additional attribute "QueryTrait" may be annotated on the node object. The QueryTrait attribute enhances the searching for data and assists in scaling the service by scoping a search according to the node object. Table 1 shows exemplary values of the QueryTrait attribute and the associated semantics.

TABLE 1

QueryTrait Attribute

| QueryTrait | Semantics |
| --- | --- |
| self::* | Current node object is returned |
| self::*/*/* | Current node object along with child node objects upto two deep |
| .//* | Equivalent to action="query" |
| self::*/@* | Equivalent to action="queryAttributes" |
| descendant::*[@name='Tim'] | Search child node objects with name 'Tim' |
| self::*[__OrderBy(@category, __Desc(@publishDate), @id) >= 'bookmark'] | Sort function added to specify sorting as well as paging. Server returns the the continuation bookmark if more data is available. |

The QueryTrait attribute extends the same principle of data-driven behavior. The exemplary embodiment utilizes the standard xpath query syntax. The xpath syntax provides an easy and well-understood syntax for specifying the queries. However, the embodiment differs from the regular xpath query. A regular xpath query returns a flattened list of node objects selected. In the case of the embodiment, the data transfer protocol returns the node objects in the appropriate places where they occur so that the returned results conform to the service definition schema. Also, extensions are added to support sorting and paging.

The application programming interfaces (APIs) and the actions 503-517 enable external products to interoperate with other service by supporting the data transfer protocol used in server network 200. Server network 200 defines a set of APIs (as discussed in the context of Table 2) for interacting with the service. (The Simple Object Access Protocol refers to an API as an "operation.") The APIs are designed to be the same for all services. (Other embodiments of the invention may utilize a different set of APIs, in which the set has a different number of APIs.) Each service, as the financial service discussed with schema 300 and schema 400, has a corresponding schema. Server network 200 provides a schema for an associated service to describe the layout of the objects and the relationships between the objects. The schema is annotated with actions.

TABLE 2

APIs (OPERATIONS)

| Operation | Semantics |
| --- | --- |
| SubmitBatch | Operation is used to submit a batch of commands to the service for processing |
| SubmitBatchSynch | Operation is same as SubmitBatch except it waits for the processing to complete and returns the output synchronously. Operation is intended for use in interactive application. |
| FindRecentBatchIDs | Operation retrieves an array of all batch IDs that were submitted during a particular date range |
| QueryBatchResults | Operation is used to query the service for the status of previously submitted batches |

Batches may be provided in a serial fashion. For example, the data provider may be submitting a monthly update that is large and that may require a substantial time to execute. Moreover, an advisor may submit an update that updates an investor while the monthly update is executing. In such a case, the update submitted by the advisor should not be over-written by the monthly update. Also, batches may be prioritized by the caller. The batches are processed in the order of their priorities. (In the embodiment, an internal batch ID on a single SQL machine, e.g. SQL server 211, is assigned for every batch that is received. This provides an ordering of the internal batch IDs. Internal batch IDs are tracked with every item (object) in the store. If the item is associated with a newer batch ID than the batch trying to update the item, updating the item by the batch is rejected.) Synchronous calls are typically interactive and have an implied higher priority than asynchronous operations. This enables the system to be responsive to interactive queries and updates even when large batches are being processed in the background. Referring to the embodiment in FIG. 2, batches are typically stored in a worker queue that is located on a file server 213 and managed by the SQL server 211.

The data transfer protocol describes only these APIs to interact with the service. The batches are sent in the SubmitBatch call. The results for the query are obtained through the QueryBatchResults. Inherently, the service is enabled for asynchronous processing and is easy enough to see how synchronous processing can be achieved from the server as well as the client end. (In the exemplary embodiment, a client may be an investor.) A sample XML transcript is provided below, showing the data transfer protocol in progress. The underlying wire protocol portions have been stripped out to focus on the data transfer protocol only. The following transcript illustrates a SubmitBatch call according to an embodiment of the invention. The SubmitBatch call utilizes QueryAttributes action 517.

```
SubmitBatch
    Firm→NorthWind, ID→1001, BatchPayload →
    <firm id="1001"
        xmlns="http://www.advisor.net/Microsoft/Documents/DataModelSchema">
            <userManager>
                <users>
                    <user id="124" action="QueryAttributes" />
                </users>
            </userManager>
    </firm>
The following XML transcript illustrates a QueryBatchResults call. The QueryBatch
Results call utilizes None action 503 and the QueryAttributes action 517.
QueryBatchResults ←
    <batchResult
        xmlns="http://www.advisor.net/Microsoft/Documents/DataModelSchema"
            batchId="1001" firmURL="NorthWind" status="success"
            startTime="2002-03-19T07:36:16.000Z"
            lastUpdatedTime="2002-03-19T07:36:17.000Z">
        <firm id="1001">
            <userManager>
                <users>
                    <user id="124" fullName="Investor #2"
                        email="advisortest2@hotmail.com" enrollmentStatus="enrolled"
                        lastLoginTime="2002-02-02T01:02:00.000Z" />
                </users>
            </userManager>
        </firm>
    </batchResult>
```

The data transfer protocol defines the semantics for uploading and querying data to server network 200 by annotating actions 503-517 to the node objects of the data that are being updated. Since the behavior is pushed onto the data, the operations on each individual piece of data do not filter out to the API level. The APIs help in delivering the batch to the service and retrieving the results from the service. Moreover, the APIs are agnostic of the type of data being transferred. For all data, mostly non-uniform, only a fixed handful of APIs are required.

The actions on the data define what operation needs to be performed on the data. Operations (APIs) define semantics for uploading incremental changes as well as complete changes. There may be several pieces of data in the same batch. For example, a batch may update one object (element) and query another object. The data transfer protocol allows different actions on the various pieces of data. This provides the flexibility to batch multiple operations in one transaction with the service.

The APIs and actions 503-517 define the data transfer protocol. The data driven model distinguishes it from traditional solutions. With prior art, APIs are typically defined for each of the objects, in which the number of APIs increases with the number of object types (e.g. document object, portfolio object, quote object, and so forth). Also, batching such operations would have to be addressed separately.

Server network 200 hosts the website of an advisory firm where the firm's clients can retrieve their investment data. The advisory firm may customize the website using tools provided by server network 200. The firm uploads the investment data of the firm's clients. The data comprises mostly of portfolios, reports and user permissions. Data may be uploaded in portions or in full. Server network 200 enables the firm's clients to retrieve the data securely from the website. The data may be enriched by augmenting the data with auxiliary data feeds such as live quotes and news.

To participate in the data transfer protocol, the objects represented in the service need to support the various actions. This is enforced by the data transfer protocol insuring that substantially all objects in the service be derived from baseObject. BaseObject defines actions (503-517) that can be performed on various objects. Objects submitted in the data transfer may have an action attribute in order to define the type of operation that the service should perform on the object. (The semantics of the actions are discussed in the context of FIG. 500.)

Batching of operations is supported by sending a payload containing multiple data elements in a single transaction. However, the batch should still conform to the schema that is defined by the service. Within the same batch, multiple actions may be performed. A single batch, for example, may update attributes in one part of the data store while querying for data from other parts of the store. By providing a flexible batch definition, the data transfer protocol supports both bulk uploads and atomic uploads.

The schematic layout of the servers for server network 200, as previously discussed, is shown in FIG. 2. SOAP server 217 may provide the Web Services Description Language (WSDL) service definition that conforms to the data transfer protocol. (WSDL is an XML-formatted language used to describe a Web service's capabilities as collections of communication endpoints capable of exchanging messages.) The WSDL describes the data transfer protocol methods available for use with the service. These methods are used by the data providers to interact with SOAP server 217. Table 2 shows the APIs (corresponding to "operations") and the associated semantics.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method, executing within a computer having a processor and a memory, for updating a central data store that comprises a plurality of objects, said central data store including data-driven behavior that performs actions upon receiving required respective data, the method comprising:
  (a) specifying a data schema as a data structure that describes a relationship between the plurality of objects, the data schema being specific to a supported service;
  (b) identifying one of the plurality of objects as an object for updating;
  (c) annotating at least one action attribute of a plurality of actions to the object of the plurality of objects in order to add an operation that can be performed on a data portion of the object, wherein each action is general such that it can be applied to any of the plurality of objects;
  (d) receiving data structured in conformance with said data schema and including said at least one action attribute; and
  (e) said central data store performing one or more of said actions for all objects for which said respective action attribute applies based on the relationship described in the data schema.

2. The method of claim 1, wherein at least one action of said plurality of actions is updating the data of the annotated object to which the action has been annotated.

3. The method of claim 2, wherein only data of the identified object is updated.

4. The method of claim 1, wherein an object of the plurality of objects is a reference object that identifies another object.

5. The method of claim 1, wherein said receiving step is performed using an application programming interface (API), and wherein said application programming interface together with said at least one action attribute carry out said data-driven behavior using received data.

6. The method of claim 5, wherein at least two actions are invoked when said data is transmitted using a batch process implemented based on the application programming interface.

7. The method of claim 5, wherein said central data store includes a fixed number of application programming interfaces.

8. The method of claim 5, wherein the application programming interface is selected from the group consisting of a SubmitBatch, a SubmitBatchSync, a FindkecentBatchIDs, and QueryBatchResults.

9. The method of claim 5, wherein a first object of said plurality of objects is annotated with a first action attribute and a second object of said plurality of objects is annotated with a second action attribute.

10. The method of claim 1, wherein said plurality of actions are selected from the group consisting of a None action, an Update action, and UpdateAttributes action, a Delete action, a Replace action, a ReplaceAttributes action, a Query action, and a QueryAttributes action.

11. The method of claim 10, wherein the Query action is associated with a QueryTrait attribute, wherein a scope of search identified by the Query action is restricted to the QueryTrait attribute.

12. The method of claim 1, wherein a plurality of actions are updating actions for updating the data of a plurality of respective objects, and wherein said plurality of actions are performed in batch.

13. The method of claim 1, wherein the data schema describes a hierarchical relationship between the plurality of objects.

14. The method of claim 1, wherein the data schema is specified for a firm object, and wherein the firm object is related to a permission object and at least one manager object.

15. The method of claim 14, wherein the at least one manager object is selected from the group consisting of a userManager object, a portfolioManager object, a webManager object, a storageManager object, and a statisticsManager object.

16. The method of claim 1, wherein the data schema is specified for a user object, wherein the user node object is related to a permissions object and at least one reference object, and wherein the at least one reference object identifies another object.

17. The method of claim 16, wherein the another object is selected from the group consisting of a document object and a portfolio object.

18. The method of claim 16, wherein referential integrity is maintained for the at least one reference object.

19. The method of claim 18, further comprising receiving a request to delete an object from the data store; removing a reference object that references an other object and the object to be deleted; and deleting the object.

20. The method of claim 18, further comprising referencing another object that has not been created; creating the another object.

21. A computer-readable storage medium having computer-executable actions for updating a central data store that comprises a plurality of objects, said central data store including data-driven behavior that performs actions upon receiving required respective data, comprising steps of:
  (a) specifying a data schema as a data structure that describes a relationship between the plurality of objects, the data schema being specific to a supported service;
  (b) identifying one of the plurality of objects as an object for updating;
  (c) annotating at least one action attribute of a plurality of actions to the object of the plurality of objects in order to add an operation that can be performed on a data portion of the object, wherein each action is general such that it can be applied to any of the plurality of objects;
  (d) receiving data structured in conformance with said data schema and including said at least one action attribute; and
  (e) said central data store performing one or more of said actions for all objects for which said respective action attribute applies based on the relationship described in the data schema.

22. The computer-readable storage medium of claim 21, wherein said receiving step is performed using an application programming interface (API), and wherein said application programming interface together with said at least one action attribute carry out said data-driven behavior based on received data.

23. The computer-readable storage medium of claim 22, wherein at least two actions are invoked when said data are transmitted using a batch process implemented based on the application programming interface.

24. The computer-readable storage medium of claim 21, wherein referential integrity is maintained for at least one reference object.

25. A data store system that supports synchronizing stored information, the data store system including data-driven behavior that performs actions upon receiving required respective data, the data store system comprising:
  a storage device that stores at least one object;
  a data structure that represents the at least one object and that is located on the storage device, the data structure having a data schema that is specific to a supported service;

a data transfer protocol interface, the data transfer protocol interface supporting a data transfer protocol, the data transfer protocol interface comprising:

an action module that supports a group of actions that are invoked upon being transferred data structured in conformance with said data schema for at least one said object; and an application programming interface (API) module that supports a group of application programming interfaces for transferring data, the group of application programming interfaces being agnostic to the type of data being transferred, wherein at least one action of the group of actions is invoked upon receiving the transferred data.

26. The data store system of claim 25, wherein said group of actions are selected from the group consisting of a None action, an Update action, and UpdateAttributes action, a Delete action, a Replace action, a ReplaceAttributes action, a Query action, and a QueryAttributes action.

27. The data store system of claim 25, wherein the group of application programming interfaces is selected from the group consisting of a SubmitBatch, a SubmitBatchSync, a FindRecentBatchIDs, and QueryBatchResults.

28. The data store system of claim 25, wherein the data store is defined as a data schema.

29. The data store system of claim 25, wherein the data transfer protocol interface further comprises:

a Web Services Description Language service definition module that supports a service and that conforms to the data transfer protocol.

30. A method, executing within a computer having a processor and a memory, of updating a central data store that comprises a plurality of objects, the central data store including data driven behavior that performs actions upon receiving required respective data, the method comprising:

(a) specifying a data schema as a data structure that describes a relationship between the plurality of objects, the data schema being specific to a supported service;

(b) identifying one of the plurality of objects as an object for updating;

(c) annotating at least one action attribute of a plurality of actions to the object of the plurality of objects in order to add an operation tat can be performed on a data portion of the object, wherein each action is general such that it can be applied to any of the plurality of objects;

(d) receiving data structured in conformance with said data schema and including said at least one action attribute; and (e) said central data store using an application programming interface to deliver said data as a batch to all objects having the respective action attribute in order to invoke said at least one action.

* * * * *

UNITED STATES PATENT AND TRADEMARK OFFICE
CERTIFICATE OF CORRECTION

PATENT NO.       : 7,484,219 B2
APPLICATION NO.  : 10/301223
DATED            : January 27, 2009
INVENTOR(S)      : Kanchan Mitra It is certified that error appears in the above-identified patent and that said Letters Patent is hereby corrected as shown below:

In column 11, line 42, in Claim 8, delete "FindkecentBatchIDs." and insert
-- FindRecentBatchIDs, --, therefor.

Signed and Sealed this
Third Day of May, 2011

David J. Kappos
*Director of the United States Patent and Trademark Office*